(12) United States Patent
Hieber et al.

(10) Patent No.: US 9,214,755 B2
(45) Date of Patent: Dec. 15, 2015

(54) HOUSING WALL SCREW CONNECTION FOR AN ELECTRICAL PLUG-IN CONNECTOR

(71) Applicant: CONINVERS GmbH, Herrenberg (DE)

(72) Inventors: Alexander Hieber, Herrenberg (DE); Jurgen Sahm, Ammerbuch (DE)

(73) Assignee: CONINVERS GmbH, Herrenberg (DE)

( * ) Notice: Subject to any disclaimer, the term of this patent is extended or adjusted under 35 U.S.C. 154(b) by 0 days.

(21) Appl. No.: 14/339,751

(22) Filed: Jul. 24, 2014

(65) Prior Publication Data

US 2015/0034380 A1 Feb. 5, 2015

(30) Foreign Application Priority Data

Aug. 5, 2013 (EP) .................................... 13401085

(51) Int. Cl.
*H01R 13/52* (2006.01)
*H02G 15/013* (2006.01)
*H01R 13/74* (2006.01)

(52) U.S. Cl.
CPC .......... *H01R 13/5202* (2013.01); *H01R 13/741* (2013.01); *H02G 15/013* (2013.01)

(58) Field of Classification Search
CPC ... H01R 13/741; H01R 13/74; H01R 13/5202
USPC ......................................... 439/548, 556, 559
See application file for complete search history.

(56) References Cited

U.S. PATENT DOCUMENTS

| | | | | |
|---|---|---|---|---|
| 3,200,366 A | * | 8/1965 | Stuart | F16J 15/04 174/153 R |
| 4,772,221 A | * | 9/1988 | Kozlof | H01R 13/646 439/544 |
| 6,083,040 A | * | 7/2000 | Mosquera | H01R 13/5202 439/548 |

(Continued)

FOREIGN PATENT DOCUMENTS

| | | |
|---|---|---|
| DE | 203 15 666 U1 | 12/2003 |
| DE | 20 2007 00325 | 5/2007 |
| DE | 10 2006 03609 | 1/2008 |

OTHER PUBLICATIONS

European Search Report for corresponding European Application No. EP 13 40 1085 dated Nov. 11, 2013.

*Primary Examiner* — James Harvey
(74) *Attorney, Agent, or Firm* — Renner, Otto, Boisselle & Sklar, LLP (57) ABSTRACT

A sealing wall grommet for a wall of an electrical device, comprising a flange-like installation sleeve for receiving a plug part having electrical contacts, to which there can be connected in a plug-in manner a mating plug part which has a securing screw-in sleeve that can be screwed to the installation sleeve and acts as a pull-out prevention means for the mating plug part, wherein the installation sleeve is designed to receive a plug-in section of the plug part and has an abutment which is connected to the installation sleeve, runs around the outer circumference thereof and has an annular seal for the wall. According to the invention, a tubular tensioning sleeve is provided for tensioning the installation sleeve, which tensioning sleeve has at least one inwardly projecting latching means that cooperates with a mating latching means formed on the outside of the installation sleeve. The tensioning sleeve pre-tensions the installation sleeve against the wall in such a way that the elastic seal is effective and the installation sleeve is movable in the radial direction.

9 Claims, 10 Drawing Sheets

(56) References Cited

U.S. PATENT DOCUMENTS

| | | | | |
|---|---|---|---|---|
| 6,171,141 B1* | 1/2001 | Yasui | ............ | F16C 1/105 |
| | | | | 439/354 |
| 6,293,423 B1* | 9/2001 | Masuda | ............ | H01R 13/506 |
| | | | | 220/326 |
| 6,616,479 B1* | 9/2003 | Jones | ............ | F16B 19/1081 |
| | | | | 411/48 |
| 7,214,094 B2* | 5/2007 | Kaminski | ............ | B60D 1/64 |
| | | | | 439/316 |
| 2003/0017728 A1* | 1/2003 | Ogawa | ............ | H01R 31/06 |
| | | | | 439/79 |
| 2005/0127247 A1* | 6/2005 | Seymour | ............ | H01R 13/74 |
| | | | | 248/56 |
| 2010/0285673 A1* | 11/2010 | Orlando | ............ | H01R 13/622 |
| | | | | 439/34 |
| 2012/0196464 A1* | 8/2012 | Lu | ............ | H01R 13/5202 |
| | | | | 439/277 |
| 2015/0034380 A1* | 2/2015 | Hieber | ............ | H01R 13/741 |
| | | | | 174/659 |
| 2015/0070857 A1* | 3/2015 | Lin | ............ | H01R 13/623 |
| | | | | 361/752 |

* cited by examiner

HOUSING WALL SCREW CONNECTION FOR AN ELECTRICAL PLUG-IN CONNECTOR

CROSS-REFERENCE TO RELATED APPLICATION

The present application claims priority under 35 USC §119 to European Patent Application No. 13 401 085.9, filed Aug. 5, 2013, the entire disclosure of which is incorporated herein by reference.

TECHNICAL FIELD OF THE INVENTION

The invention relates to a sealing wall grommet for a wall of an electrical device, comprising a flange-like installation sleeve for receiving a plug part having electrical contacts, to which there can be connected, in a plug-in manner, a mating plug part which has a securing screw-in sleeve that can be screwed to the installation sleeve and acts as a pull-out prevention means for the mating plug part, wherein the installation sleeve is designed to receive a plug-in section of the plug part and has an abutment which is connected to the installation sleeve, projects away therefrom on the outer circumference thereof and has an annular seal for the wall, which abutment prevents the installation sleeve from passing fully through a wall opening of the wall, and comprising a tensioning element which engages at least partially around the outside of the installation sleeve and by means of which force can be applied to the installation sleeve in the direction of the abutment against the wall, so that the abutment can be kept in abutment against the wall, and wherein the tensioning element is a tubular tensioning sleeve which has at least one inwardly projecting latching means that cooperates with a mating latching means formed on the outside of the installation sleeve.

Electrical and electronic devices often have plug-in connectors which are guided out of a housing wall and by which the connection of electrical leads to the device is facilitated. Known grommets of this type are usually designed in such a way that, in the installed state, they are fixedly connected to the wall and penetrate a wall opening of the wall. To this end, they are often designed as annular installation sleeves which have a circumferential annular collar and which are screwed to the wall with the interposition of a seal. The installation sleeve is intended to receive a plug part which has electrical contacts, for example an insulating body having pin-like and/or bushing-like plug contacts. The plug part may for example be connected to an electrical printed circuit board via connecting leads or may be soldered directly to the printed circuit board. Printed circuit boards with plug parts soldered into or onto them are usually fastened directly to the housing wall or arranged in a fixed position close to the housing wall in such a way that the plug part projects with a plug-in section into the installation sleeve. The annular collar of the installation sleeve, which serves as an abutment, may in this case be arranged on the inner side of the wall assigned to the interior of the device or on the outer side of the wall remote from the interior. The installation sleeve of known wall grommets is usually securely screwed to the wall before the printed circuit board is mounted in the housing.

As a result of the manufacturing process, the position of the fastening devices for the printed circuit board and of the wall opening for the installation sleeve of the housing and the position of the plug part on the printed circuit board are subject to certain tolerances which may lead to the situation whereby the plug part has a greater or smaller offset from the central axis of the installation sleeve. If the position of the plug part does not comply with the intended design, difficulties may arise when the printed circuit board is being mounted with engagement of the plug-in section in the installation sleeve. Depending on the size of the offset, the plug part may not be able to be inserted at all, or may be able to be inserted only eccentrically, into the installation sleeve, so that a radial realignment of the installation sleeve is necessary in order to achieve a concentric arrangement of the plug-in section in the installation sleeve. This problem occurs to a greater extent if the printed circuit board has a plurality of plug parts arranged at a distance from one another, each of these being assigned a dedicated installation sleeve on the wall of the device.

DESCRIPTION OF THE RELATED ART

With regard to the general prior art, reference is made to the document DE 203 15 666 U1. Said document discloses a socket for plug-in connectors, in particular for a socket designed as a wall grommet, for installation in panel-shaped materials, comprising an insulating body in which contact elements are arranged, wherein the plug-in connectors can be plugged in on both sides of the insulating body. The known socket has a fastening sleeve in which the insulating body is arranged, with an undercut circumferential annular collar arranged externally and approximately centrally on the fastening sleeve, via which collar a latching element can be immovably fixed to the fastening sleeve, said latching element having an integrally formed latching ring which is interrupted multiple times in the axial direction and has inwardly projecting latching protrusions. For sealing purposes and in order to compensate tolerances, a sealing ring is provided which is arranged between a front outer ring of the fastening sleeve and the mounting wall and which is squashed when the latching element is latched to the fastening sleeve.

SUMMARY OF THE INVENTION

Proceeding from the prior art described above, the problem addressed by the invention is that of proposing a possibility which, in the event of dimensional variations, permits problem-free and positionally accurate insertion of the plug part, soldered to the printed circuit board, into the installation sleeve which has been pre-mounted on the wall.

This problem is solved according to the invention by a sealing wall grommet for a wall of an electrical device, having the features described herein.

As aspect of the invention is to provide a wall grommet in which the external diameter of the installation sleeve is chosen in a targeted manner to be somewhat smaller than the diameter of the wall opening, so as to mount the wall grommet in a sealing, radially movable and pre-tensioned manner on the wall and then to securely tension it and thus immovably fix it only once the plug part has been inserted. The abutment, which is preferably annular and runs around the installation sleeve, is assigned to the inner side of the wall and the tensioning element engaging around the installation sleeve is assigned to the outer side of the wall.

As known from the prior art, the tensioning element of the sealing wall grommet according to the invention is designed as a tubular tensioning sleeve, which has at least one inwardly projecting latching means that cooperates with at least one mating latching means formed on the outside of the installation sleeve. The latching means and the mating latching means are designed and arranged in such a way that they pre-fix the installation sleeve sealingly on the wall of the housing in a radially displaceable manner. The annular seal is kept in abutment against the inner side of the wall and is pressed against the wall via the abutment with a certain contact pressure which is selected such that a lateral displacement of the installation sleeve is possible, if necessary and with little effort in terms of force, in order to align the installation sleeve with respect to the plug-in section of the plug part that is to be received. It goes without saying that the abutment and the seal are selected to have a diameter that is considerably greater than the diameter of the wall opening. Once the plug-in section has been inserted into the installation sleeve, the installation sleeve can be immovably fixed to the wall of the housing via suitable fixing means which are integrally formed on the installation sleeve and/or the tensioning sleeve or which are not part of the wall grommet. Fixing means which do not belong to the wall grommet may be formed, for example, on the wall of the device or on the mating plug part. Fixing means provided on the mating plug part are of course effective only when the mating plug part is connected to the wall grommet in such a way that it cannot be pulled out. The fixing means may in this case be supported directly on the wall or directly or indirectly on the wall via the tensioning sleeve and thus apply force to the installation sleeve in the direction of the wall, so that the installation sleeve is movable relative to the wall until the abutment is firmly pressed against the wall. The tensioning sleeve may be formed of metal or plastic and is preferably designed to be flexible in the radial direction at least in some sections.

According to the invention, the installation sleeve has an internal thread for an external thread of the securing screw-in sleeve of the mating plug part, wherein the installation sleeve is designed with sleeve segments extending in the axial direction, with segment intermediate spaces extending therebetween, and wherein radially running transverse webs are arranged on the inside of the tensioning sleeve, which transverse webs extend through the segment intermediate spaces and protrude beyond the installation sleeve on the inside. The tensioning sleeve can thus be moved in the direction of the abutment by screwing the securing screw-in sleeve to the installation sleeve, wherein the securing screw-in sleeve pushes against the transverse webs of the tensioning sleeve. The sealing wall grommet according to the invention is intended to receive a plug part which is arranged on a printed circuit board and which is soldered to the latter.

The installation sleeve has an internal thread for an external thread of the securing screw-in sleeve. This means that a free annular space is provided between the plug-in section of the plug part and the inner wall, into which a screw-in section of the securing screw-in sleeve can be inserted, said screw-in section having the external thread. The securing screw-in sleeve thus forms a pull-out prevention means for the mating plug. As the securing screw-in sleeve of the mating plug part is being screwed to the installation sleeve, the screw-in section of the securing screw-in sleeve can be supported at the front against the transverse webs of the tensioning sleeve and thus can move the tensioning sleeve in the direction of the abutment of the installation sleeve. In this way, the screw-in section of the securing screw-in sleeve acts as a fixing means which presses the abutment firmly against the wall. The tensioning sleeve can thus be moved in the direction of the abutment, which is to say against the outer side of the wall, so that it is supported against the outside of the wall via the flexible tensioning ring and/or directly. As the securing screw-in sleeve is being screwed to the installation sleeve, the flexible tensioning ring is in any case further tensioned. By virtue of axial displacement of the tensioning sleeve, the contact pressure of the seal against the inner side of the wall is moreover considerably increased and thus, on one hand the sealing effect of the seal is increased and on the other hand the installation sleeve is fixed such that it cannot be moved laterally relative to the wall opening of the wall. Depending on the design of the installation sleeve and of the tensioning sleeve, the increased contact pressure can be maintained even when the mating plug is removed from the wall grommet.

In one embodiment of the sealing wall grommet according to the invention, the inside of the tensioning sleeve has a cylindrical guide sleeve for the plug-in section of the plug part, which guide sleeve is integrally formed on the transverse webs, is held by the transverse webs and delimits an annular space between the tensioning sleeve and the guide sleeve. The outer side of the guide sleeve preferably bears against the plug-in section of the plug part and supports it laterally. It thus stabilizes the plug part so that the plug-in section is arranged in a positionally stable manner in terms of the alignment relative to the installation sleeve.

According to the invention, in one advantageous embodiment of the invention, a flexible tensioning ring is arranged between the abutment and the tensioning sleeve of the wall grommet, which flexible tensioning ring, when the tensioning sleeve is latched to the installation sleeve, presses the elastic seal against the wall in a sealing manner with a predefined low contact pressure such that the installation sleeve is still radially movable, if necessary, after being pre-mounted.

In one preferred embodiment of the wall grommet according to the invention, a first latching position is provided, in which the tensioning sleeve pre-tensions the installation sleeve against the wall in such a way that the elastic seal is effective and the installation sleeve is movable in the radial direction, so long as the wall opening provided in the wall for receiving the installation sleeve is formed with a diameter greater than that of the installation sleeve. An intermediate space in the form of an annular gap is thus formed between the installation sleeve and the rim of the wall opening when the installation sleeve is installed in the wall, which intermediate space permits a lateral displacement of the installation sleeve in the radial direction and thus permits alignment of the installation sleeve relative to the plug part. The intermediate space is determined via a tolerance calculation.

Preferably, the latching of the first latching position between the tensioning sleeve and the installation sleeve can be released by screwing the securing screw-in sleeve to the installation sleeve. As the securing screw-in sleeve is being screwed to the installation sleeve, the screw-in section of the securing screw-in sleeve transmits sufficient force to the latching means of the tensioning sleeve and/or to the mating latching means of the installation sleeve to release the latching. The latching is released without any further measures and without any damage to the latching means or mating latching means, so that a subsequent latching of the tensioning sleeve and installation sleeve in the first latching position remains possible.

In another embodiment of the wall grommet according to the invention, a second latching position is provided between the tensioning sleeve and the installation sleeve, which lies closer to the abutment than the first latching position, wherein in the second latching position the tensioning sleeve is axially fixed in an immovable and sealing manner to the installation sleeve, once the securing screw-in sleeve has been removed from the wall grommet. In this case, the second latching position is preferably designed such that it cannot be released or can be released only with the aid of tool.

Advantages of the invention are that the sealing wall grommet is already sealed in the pre-mounted, radially displaceable state, even without the mating plug. In addition, mounting is possible in a particularly simple manner, in particular without the need for a tool. The sealing wall grommet can be used directly for different wall thicknesses or can easily be adapted.

The invention will be explained in more detail below with reference to an example of embodiment which is shown in the drawing. Further features of the invention will become apparent from the following description of the example of embodiment of the invention in conjunction with the claims and the appended drawings. The individual features of the invention can be implemented alone or in combination in different embodiments of the invention. In the drawings:

DETAILED DESCRIPTION OF THE INVENTION

Figure 1A:
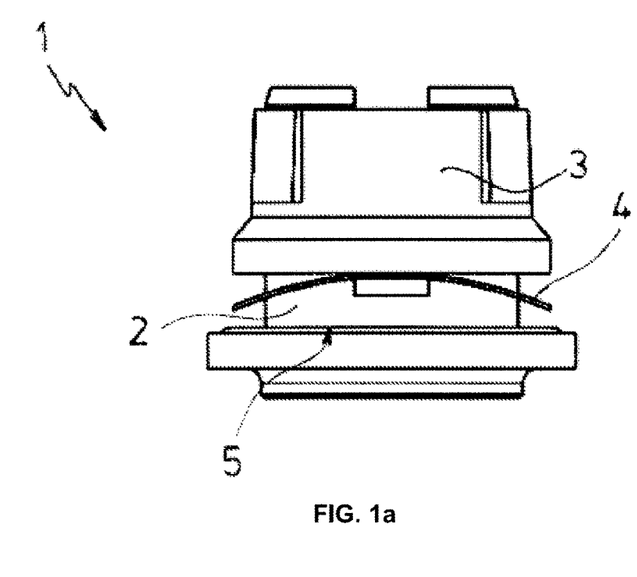
FIG. 1a shows a sealing wall grommet according to the invention comprising a flange-like installation sleeve and a tubular tensioning sleeve, in an assembled view
Figure 1B:
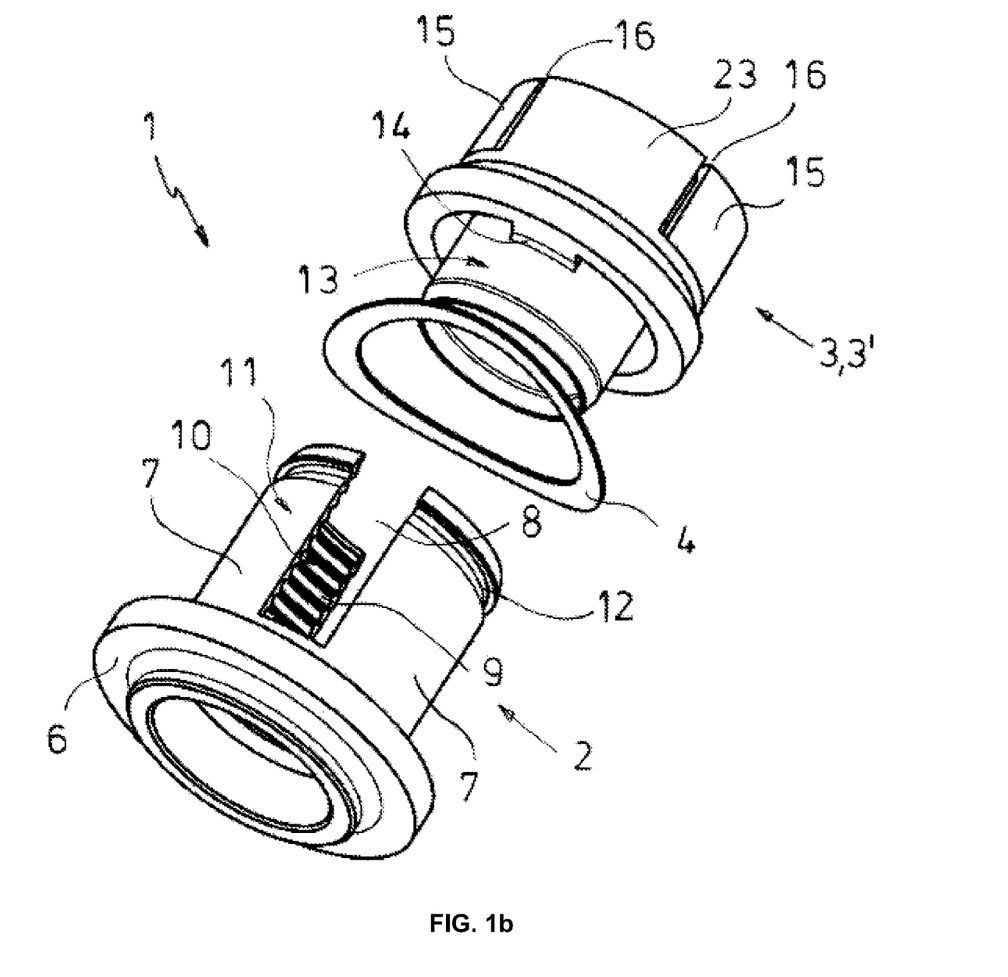
FIG. 1b shows in an exploded view.

FIG. 1a shows an example of embodiment of a sealing wall grommet 1 according to the invention, which comprises a flange-like installation sleeve 2, a tubular tensioning sleeve 3 as the tensioning element 3', a flexible tensioning ring 4 and an elastic annular seal 5. FIG. 1a shows the wall grommet 1 in assembled form in side view, FIG. 1b shows the wall grommet in an exploded perspective view. The seal 5 which is visible in FIG. 1a is hidden in FIG. 1b by the abutment 6, which is connected to the installation sleeve 2 and runs around the outer circumference thereof. The installation sleeve 2 has two sleeve segments 7 which extend in the axial direction and which are separated by two segment intermediate spaces 8. On an inner wall 9 of the installation sleeve 2 the sleeve segments 7 have an internal thread 10, and on an outer wall 11 they have mating latching means 12 for the tensioning sleeve 3, said mating latching means being designed as a circumferential annular groove. The tensioning sleeve 3 has an integrally formed guide sleeve 13 which is connected to the tensioning sleeve 3 via transverse webs 14. The tensioning sleeve 3 is in segmented form in the circumferential direction at an end remote from the guide sleeve 13. It has two flexible legs 15 which are separated by two longitudinal slots 16 of the tensioning sleeve 3. Formed at a free end of the flexible legs 15 are inwardly projecting latching means 17 (visible in FIG. 4a) which cooperate with the mating latching means 12 formed on the outside of the installation sleeve 2.

Figure 2:
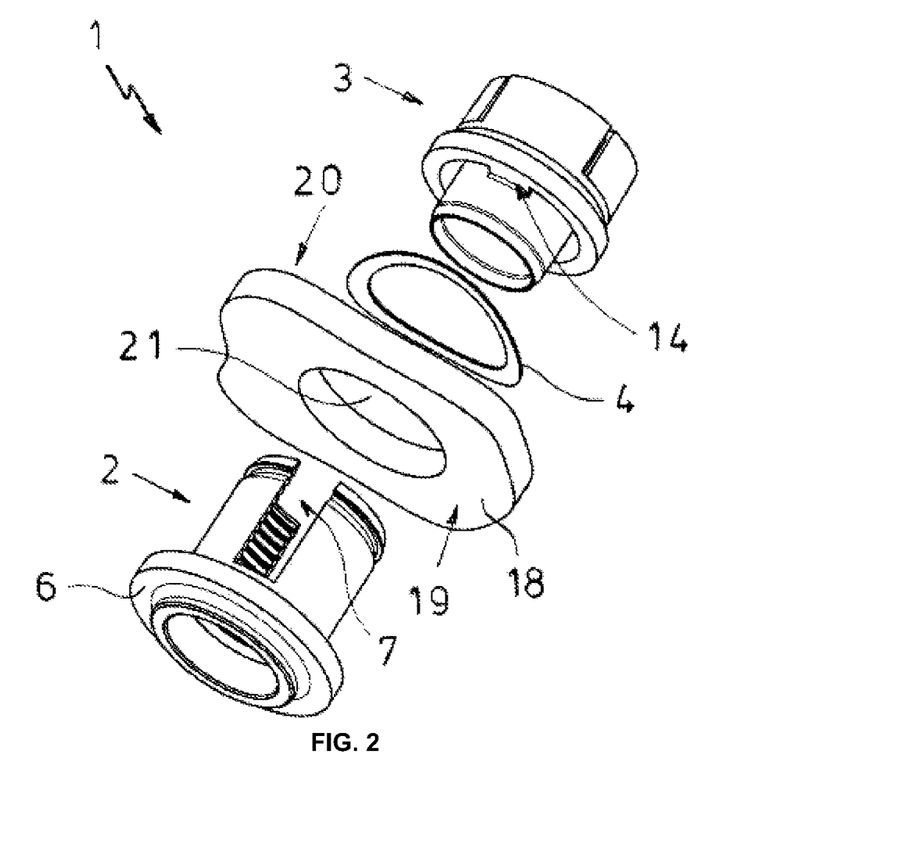
FIG. 2 shows the arrangement of the wall grommet of FIG. 1 on a wall of a housing.

FIG. 2 shows the way in which the wall grommet 1 of FIG. 1 is arranged on a wall 18 of a housing (not shown in the drawing). The wall 18 has an inner side 19 and an outer side 20. The inner side 19 of the wall 18 is assigned to the interior of a device (not shown). The outer side 20 of the wall 18 is arranged on the side remote from the interior of the housing. The wall 18 has a wall opening 21 for receiving the installation sleeve 2. The wall opening 21 is of circular shape, corresponding to the cylindrical installation sleeve 2. In order to mount the wall grommet 1 on the wall 18, the installation sleeve 2 is inserted into the wall opening 21 from the inner side 19 of the wall, with the seal 5 arranged on the circumferential abutment 6, until the seal 5 bears against the inner side 19. The flexible tensioning ring 4 is then threaded onto the installation sleeve 2 from the outer side 20, and then the tensioning sleeve 3 is assembled with the installation sleeve 2, engaging over the outside of the installation sleeve 2. During this, the tensioning sleeve 3 is aligned in the circumferential direction such that the transverse webs 14 of the tensioning sleeve 3 are aligned with the segment intermediate spaces 8 of the installation sleeve 2.

Figure 3A:
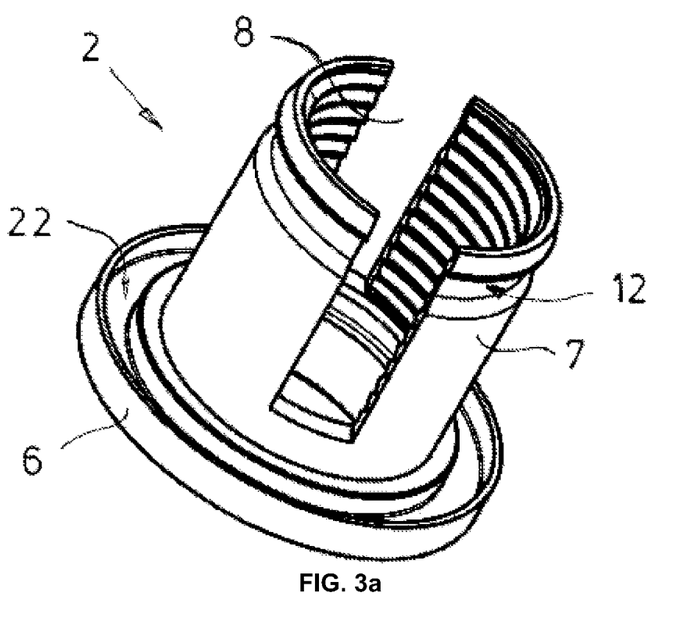
FIG. 3a shows the installation sleeve of FIG. 1, on an enlarged scale, in a perspective view
Figure 3B:
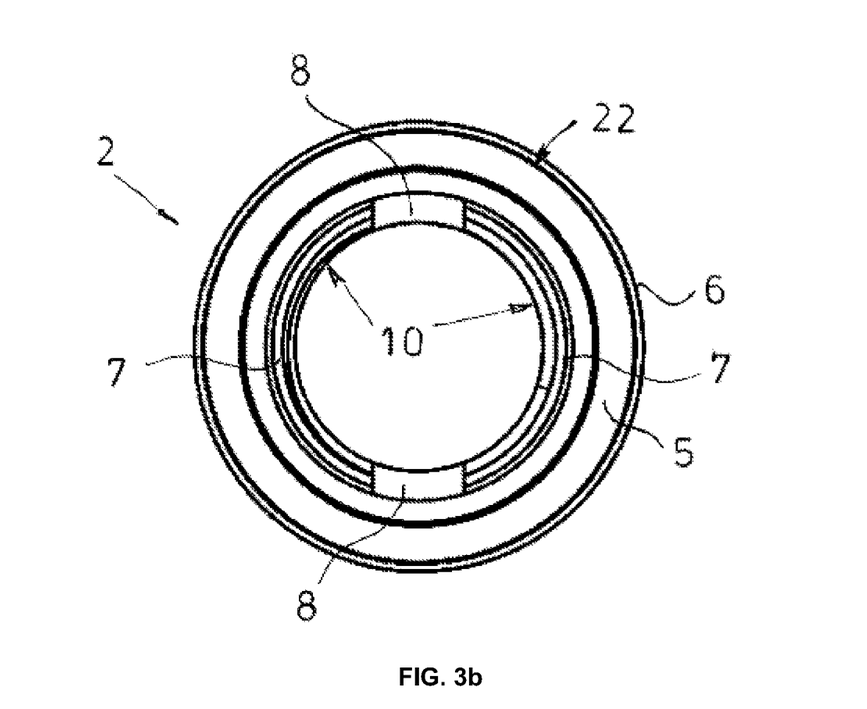
FIG. 3b shows in plan view.

FIG. 3 shows the installation sleeve of FIG. 1, on an enlarged scale, in a perspective view (FIG. 3a) and in plan view (FIG. 3b). It can be seen from FIG. 3a that the sleeve segment intermediate spaces 8 extend close to the abutment 6. In this figure, the installation sleeve 2 is shown without the seal 5. In order to receive the seal 5, the abutment 6 running around the circumference of the installation sleeve 2 has an annular depression 22 which is adapted to the seal 5 and which is visible in FIG. 3a. At the end of the installation sleeve 2 remote from the abutment 6, the mating latching means 12 for the latching means 17 of the tensioning sleeve 3 are visible, said mating latching means being arranged on the sleeve segments 7. The mating latching means 12 are designed as an annular groove which extends in the circumferential direction of the installation sleeve 2. FIG. 3b shows the installation sleeve 2 with its sleeve segments 7 and segment intermediate spaces 8 from above, in a view looking towards the abutment 6 and with the seal 5 located in the depression 22.

Figure 4A:
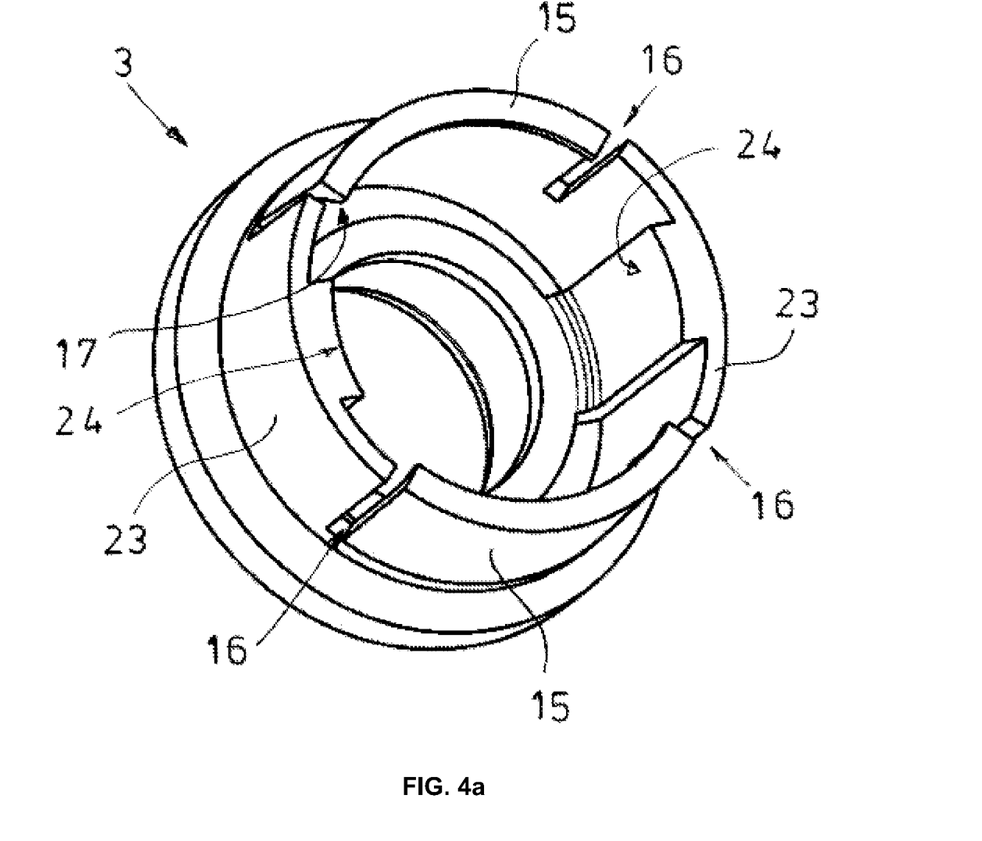
FIG. 4a shows the tensioning sleeve of FIG. 1, on an enlarged scale, in a perspective view as seen from above
Figure 4B:
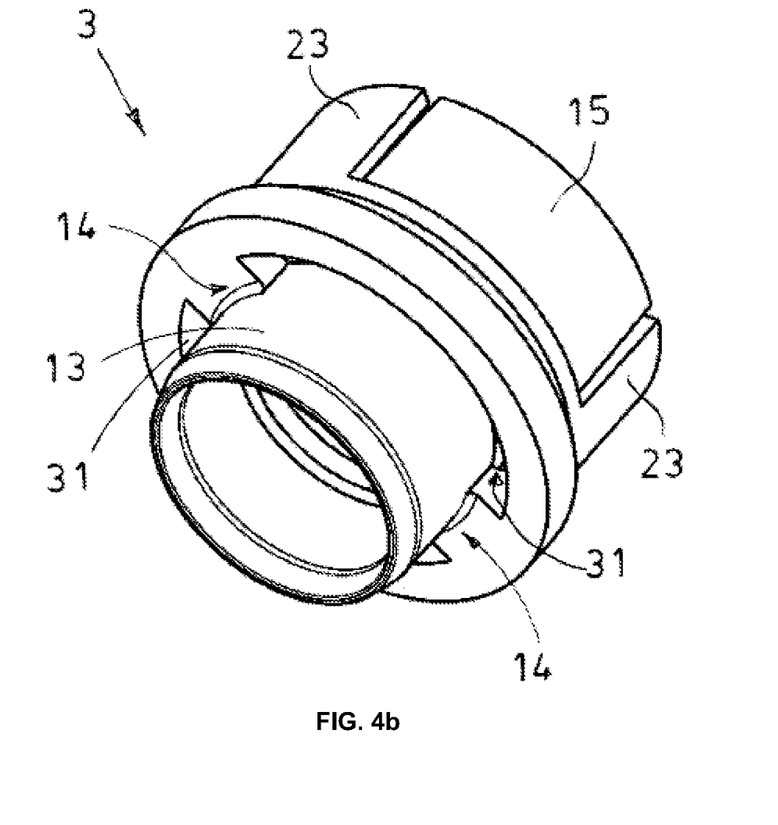
FIG. 4b shows from below.

In FIG. 4, the tensioning sleeve 3 is shown on an enlarged scale in a perspective view. FIG. 4a clearly shows the flexible legs 15, at the free end of which the latching means 17 are arranged, said latching means being designed to correspond to the mating latching means 12 of the installation sleeve 2. The longitudinal slots 16 separate the flexible legs 15 from fixed legs 23 of the tensioning sleeve 3. The two fixed legs 23 have on the inside raised guide webs 24 which extend in the axial direction and which are connected to the transverse webs 14 that hold the guide sleeve 13. FIG. 4b shows the tensioning sleeve 3 from below. The transverse webs 14 and the guide sleeve 13 can be seen better here than in FIG. 4a. Also visible in this figure is the annular space 31 between the tensioning sleeve 3 and the guide sleeve 13, which annular space receives the sleeve segments 7 of the installation sleeve 2 at the time of assembly.

Figure 5A:
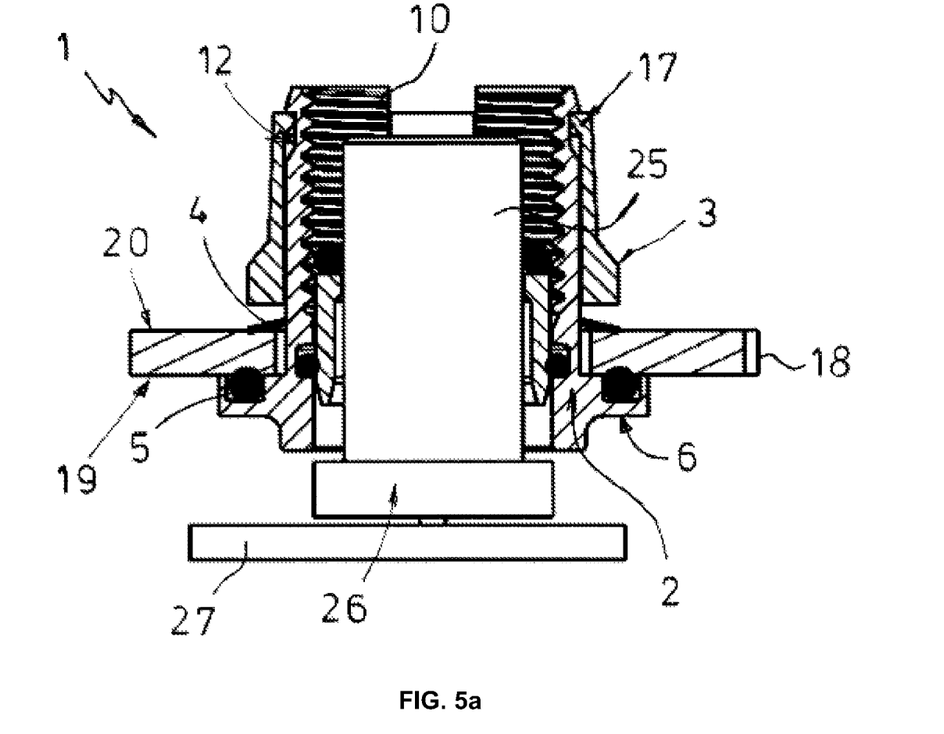
FIG. 5a shows the wall grommet of FIG. 2, mounted on the wall, with the plug part introduced, in a displaceable pre-fixed state

FIG. 5a illustrates the wall grommet 1 with the plug-in section 25 of the plug part 26 inserted, mounted on the wall 18 without the mating plug part in place, in a sectional view. The plug part 26 is arranged on a printed circuit board 27. The abutment 6 with the sealing ring 5 is in abutment against the wall 18, the installation sleeve 2 projecting from the outer side 20 of the wall 18. The installation sleeve 2 bears the tensioning sleeve 3 in a first latching position, in which the latching means 17 of the tensioning sleeve 3 are in engagement with the mating latching means 12 of the installation sleeve 2. The flexible tensioning ring 4 is arranged between the wall 18 and the tensioning sleeve 3. The tensioning sleeve 3 pre-tensions the flexible tensioning ring 4, which in turn keeps the abutment 6 in sealing abutment against the inner side 19 of the wall 18. The mating latching means 12 and the latching means 17 are designed in such a way that the tensioning sleeve 3 is axially displaceable in the direction of the abutment 6 of the installation sleeve 2 until the tensioning sleeve 3 bears against the outer side 20 of the wall 18.

Figure 5B:
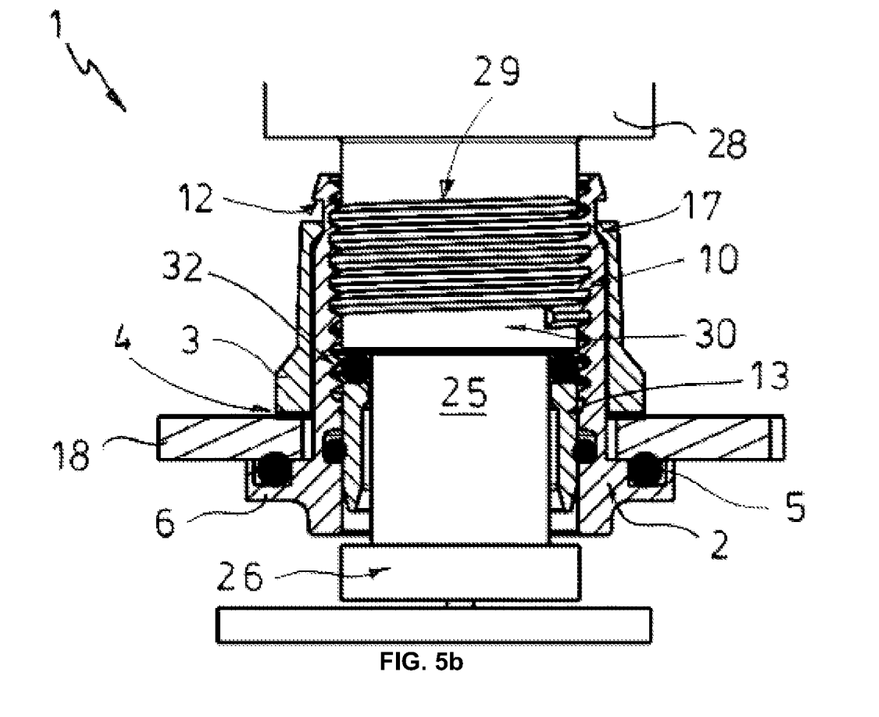
FIG. 5b shows in an immovably fixed state, in longitudinal section.

FIG. 5*b* shows the wall grommet 1 of FIG. 5*a* with the mating plug part placed onto the plug part 26 and with the securing screw-in sleeve 28 of the mating plug part screwed in. The tensioning sleeve 3 is moved in the direction of the abutment 6 as the securing screw-in sleeve 28 of the mating plug part is being screwed to the installation sleeve 2. To this end, the securing screw-in sleeve 28 has at the front on its outer side an external thread 29 which cooperates with the internal thread 10 of the installation sleeve 2. In the illustrated example of embodiment, the screw-in section 30 of the securing screw-in sleeve 28, which bears the external thread 29, presses at the front, via a sealing ring 32, against the transverse webs 14 and the guide sleeve 13 in order to move the abutment 6 and the tensioning sleeve 3 towards one another. The flexible tensioning ring 4 is pressed flat by the tensioning sleeve 3.

Figure 6:
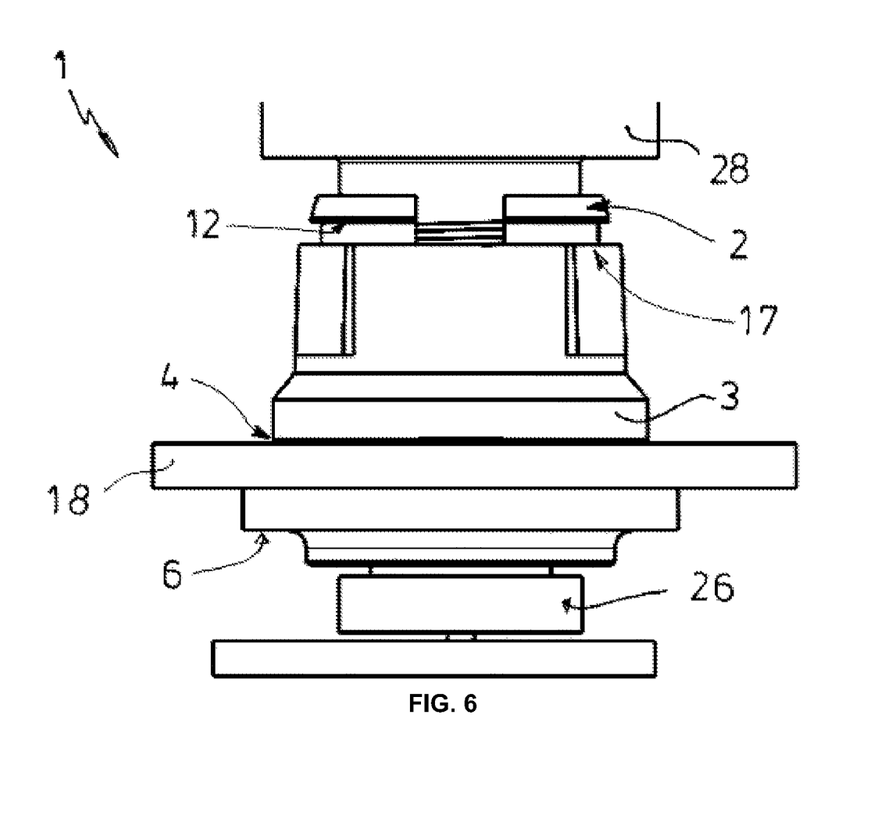
FIG. 6 shows the wall grommet of FIG. 1 fixed to the wall with the plug-in section of the plug part inserted, in side view.

FIG. 6 shows, again in side view, the wall grommet fixed to the wall 18 with the plug-in section 25 of the plug part 26 inserted in the installation sleeve 2. The abutment 6 with the seal 5 is pressed sealingly against the wall 18. To this end, the securing screw-in sleeve 28 that has been placed on and screwed to the installation sleeve 2 presses the front of the tensioning sleeve 3 against the wall 18. It can clearly be seen that, compared to the first latching position, in the illustrated immovable position, the tensioning sleeve 3 is displaced relative to the installation sleeve 2 in the direction of the abutment 6. In the illustrated position, and as can be seen in FIG. 5*b*, the latching means 17 of the tensioning sleeve 3 are no longer supported in the axial direction behind the mating latching means 12 of the installation sleeve 2.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A sealing wall grommet for a wall of an electrical device, comprising a flange-like installation sleeve for receiving a plug part having electrical contacts, to which there can be connected a mating plug part which has a securing screw-in sleeve that can be screwed to the installation sleeve and acts as a pull-out prevention means for the mating plug part, wherein the installation sleeve is designed to receive a plug-in section of the plug part and has an abutment which is connected to the installation sleeve, projects away therefrom on the outer circumference thereof and has an annular elastic seal for the wall, wherein the abutment prevents the installation sleeve from passing fully through a wall opening of the wall, and comprising a tensioning element which engages at least partially around the outside of the installation sleeve and by means of which force can be applied to the installation sleeve in the direction of the abutment against the wall so that the abutment is kept in abutment against the wall, and wherein the tensioning element is a tubular tensioning sleeve which has at least one inwardly projecting latching means that cooperates with a mating latching means formed on the outside of the installation sleeve, wherein in that the installation sleeve is designed to receive a plug part which is arranged on a printed circuit board and which is soldered to the latter, in that the installation sleeve has an internal thread for an external thread of the securing screw-in sleeve, in that the installation sleeve has sleeve segments extending in the axial direction, with segment intermediate spaces extending therebetween, in that the tensioning sleeve has radially extending transverse webs on the inside, which transverse webs extend through the segment intermediate spaces and protrude beyond the installation sleeve on the inside, and in that the tensioning sleeve can be moved in the direction of the abutment by screwing the securing screw-in sleeve to the installation sleeve, wherein the securing screw-in sleeve pushes against the transverse webs of the tensioning sleeve.

2. The sealing wall grommet according to claim 1, wherein the internal thread of the installation sleeve is arranged on an inner wall of the sleeve segments and the mating latching means of the installation sleeve is arranged on an outer wall of the sleeve segments.

3. The sealing wall grommet according to claim 1, wherein the inside of the tensioning sleeve has a cylindrical guide sleeve for the plug-in section of the plug part, which guide sleeve is integrally formed on the transverse webs, is held by the transverse webs and delimits an annular space between the tensioning sleeve and the guide sleeve.

4. The sealing wall grommet according to claim 1, wherein a flexible tensioning ring is arranged between the abutment and the tensioning sleeve.

5. The sealing wall grommet according to claim 1, wherein a first latching position is provided, in which the tensioning sleeve pre-tensions the installation sleeve against the wall in such a way that the elastic seal is effective and the installation sleeve is movable in the radial direction, wherein the wall opening provided in the wall for receiving the installation sleeve is formed with a diameter greater than that of the installation sleeve.

6. The sealing wall grommet according to claim 5, wherein the latching of the first latching position can be released by screwing the securing screw-in sleeve to the installation sleeve.

7. The sealing wall grommet according to claim 1, wherein the installation sleeve can be sealingly tensioned against the wall by screwing the securing screw-in sleeve to the installation sleeve.

8. The sealing wall grommet according to claim 1, wherein a second latchig position is provided, which lies closer to the abutment than the first latching position and in which the tensioning sleeve keeps the installation sleeve axially fixed, once the securing screw-in sleeve has been removed.

9. The sealing wall grommet according to claim 1, wherein the tensioning sleeve is formed from a plastic material.

\* \* \* \* \*